(12) United States Patent
Shan et al.

(10) Patent No.: US 9,466,830 B1
(45) Date of Patent: Oct. 11, 2016

(54) METHOD AND SYSTEM FOR PROCESSING LITHIATED ELECTRODE MATERIAL

(71) Applicant: QuantumScape Corporation, San Jose, CA (US)

(72) Inventors: Jingning Shan, San Jose, CA (US); Wei Zhang, Fremont, CA (US); Rainer Fasching, Mill Valley, CA (US); Tim Holme, Mountain View, CA (US)

(73) Assignee: QuantumScape Corporation, San Jose, CA (US)

( * ) Notice: Subject to any disclaimer, the term of this patent is extended or adjusted under 35 U.S.C. 154(b) by 311 days.

(21) Appl. No.: 14/288,407

(22) Filed: May 28, 2014

Related U.S. Application Data (60) Provisional application No. 61/858,602, filed on Jul. 25, 2013.

(51) Int. Cl.
| | |
|---|---|
| H01M 4/36 | (2006.01) |
| H01M 4/04 | (2006.01) |
| H01M 4/38 | (2006.01) |
| H01M 4/1395 | (2010.01) |

(52) U.S. Cl.
CPC ............ *H01M 4/382* (2013.01); *H01M 4/04* (2013.01); *H01M 4/0404* (2013.01); *H01M 4/1395* (2013.01)

(58) Field of Classification Search
CPC ........... H01M 2004/028; H01M 4/04; H01M 4/0402; H01M 4/139; H01M 4/366; H01M 4/582; H01M 4/624; H01M 4/382; H01M 4/1395; H01M 4/0404; H01M 2220/30; Y02E 60/122; Y02P 70/54
See application file for complete search history.

(56) References Cited

U.S. PATENT DOCUMENTS

| | | | |
|---|---|---|---|
| 5,296,318 | A | 3/1994 | Gozdz et al. |
| 5,522,955 | A | 6/1996 | Brodd |
| 5,788,738 | A | 8/1998 | Pirzada et al. |
| 5,824,434 | A | 10/1998 | Kawakami et al. |
| 6,087,042 | A | 7/2000 | Sugiyama et al. |
| 6,635,114 | B2 | 10/2003 | Zhao et al. |
| 6,680,145 | B2 | 1/2004 | Obrovac et al. |
| 6,689,192 | B1 | 2/2004 | Phillips et al. |
| 7,371,338 | B2 | 5/2008 | Amatucci |

(Continued)

FOREIGN PATENT DOCUMENTS

| | | |
|---|---|---|
| EP | 1540752 B1 | 3/2010 |
| WO | 2008/095197 A2 | 8/2008 |

(Continued)

OTHER PUBLICATIONS

Rangan, S., etal. "Abstract #1473, Electronic Structure and Chemical Composition of Candidate Conversion Material Iron Oxifluoride", 220$^{th}$ ECS Meeting.

(Continued)

*Primary Examiner* — Brittany Raymond
(74) *Attorney, Agent, or Firm* — Squire Patton Boggs (US) LLP (57) ABSTRACT

The present invention is directed to energy storage devices and methods thereof. More specifically, embodiments of the present invention provide techniques for forming lithiated electrode material. In various embodiments, a conversion material is processed using n-BuLi solution to form iron nanoparticles and lithiated fluoride and/or oxide material. There are other embodiments as well.

15 Claims, 11 Drawing Sheets

(56) References Cited

U.S. PATENT DOCUMENTS

| | | |
|---|---|---|
| 7,625,671 B2 | 12/2009 | Amatucci |
| 7,947,392 B2 | 5/2011 | Amatucci et al. |
| 8,039,149 B2 | 10/2011 | Amatucci et al. |
| 8,388,754 B2 | 3/2013 | Powell et al. |
| 8,449,950 B2 | 5/2013 | Shang et al. |
| 8,465,602 B2 | 6/2013 | Shmyreva et al. |
| 8,518,604 B2 | 8/2013 | Amatucci et al. |
| 8,623,549 B2 | 1/2014 | Pereira et al. |
| 9,048,497 B2 | 6/2015 | Amatucci et al. |
| 2004/0121235 A1 | 6/2004 | Amatucci et al. |
| 2004/0126659 A1 | 7/2004 | Graetz et al. |
| 2004/0191633 A1 | 9/2004 | Johnson et al. |
| 2006/0019163 A1 | 1/2006 | Amatucci et al. |
| 2007/0221635 A1 | 9/2007 | Boulos et al. |
| 2008/0199772 A1 | 8/2008 | Amatucci et al. |
| 2011/0065001 A1 | 3/2011 | Pereira et al. |
| 2012/0009469 A1 | 1/2012 | Visco et al. |
| 2012/0032118 A1 | 2/2012 | Fichtner et al. |
| 2012/0225356 A1 | 9/2012 | Wietelmann |
| 2012/0263998 A1 | 10/2012 | Thackeray et al. |
| 2013/0048924 A1 | 2/2013 | Amatucci et al. |
| 2013/0344391 A1 | 12/2013 | Yushin et al. |
| 2014/0170493 A1 | 6/2014 | Holme et al. |
| 2014/0272564 A1 | 9/2014 | Holme et al. |
| 2014/0284526 A1 | 9/2014 | Shan |

FOREIGN PATENT DOCUMENTS

| | | |
|---|---|---|
| WO | 2013/192205 A1 | 12/2013 |
| WO | WO2014186634 A2 | 11/2014 |
| WO | WO2014197751 A1 | 12/2014 |
| WO | WO2015054320 A2 | 4/2015 |

OTHER PUBLICATIONS

Office Action mailed Apr. 24, 2015 in U.S. Appl. No. 14/318,678, 14 pages.

Office Action mailed Sep. 24, 2014 in U.S. Appl. No. 14/318,677, 16 pages.

Office Action mailed Feb. 20, 2015 in U.S. Appl. No. 13/922,214, 12 pages.

Al-Sharab, J. F., et al. "EELS Compositional and Valence Mapping in Iron Fluoride-Carbon Nanocomposites", Journal of Nanoparticle Research, 15:1500; Mar. 2013, 12 pages.

Amatucci, G. G., et al. "Formation of Lithium Fluoride/Metal Nanocomposites for Energy Storage through Solid State Reduction of Metal Fluorides", Journal of Fluorine Chemistry, 2011, vol. 132, pp. 1086-1094.

Arai, H., "Cathode Performance and Voltage Estimation of Metal Trihalides", Journal of Power Sources, 68, 1997, p. 716-719.

Arai, H., et al. "Characterization and Cathode Performance of Li1—xNi1+xO2 Prepared with the Excess Lithium Method", Solid State Ionics 80, 1995, pp. 261-269.

Badway, F., et al. "Carbon Metal Fluoride Nanocomposites: High-Capacity Reversible Metal Fluoride Conversion Materials as Rechargeable Positive Electrodes for Li Batteries", Journal of the Electrochemical Society, vol. 150, Issue 10, 2003, pp. A1318-A1327.

Badway, F., et al. "Structure and Electrochemistry of Copper Fluoride Nanocomposites Utilizing Mixed Conducting Matrices", Chemistry of Materials, 2007, vol. 19 (17), pp. 4129-4141.

Behl, W. K., and Read, J. A. "A Study of Cobalt and Manganese Fluorides as Cathode Materials for Rechargeable Lithium Cells", ECS Transactions, 2012, vol. 41, Issue 41, pp. 97-106.

Bervas, M., et al. "Investigation of the Lithiation and Delithiation Conversion Mechanisms of Bismuth Fluoride Nanocomposites", Journal of the Electrochemical Society, 2006, vol. 153, Issue 4, pp. A799-A808.

Cabana, J., et al. "Beyond Intercalation-Based Li-Ion Batteries: The State of the Art and Challenges of Electrode Materials Reacting Through Conversion Reactions", Advanced Materials, vol. 22, Issue 35, Sep. 15, 2010, pp. E170-E192.

Chevrier, V. L., et al. "First-Principles Study of Iron OxyFluorides and Lithiation of FeOF", Physical Review B 87, 094118, Mar. 29, 2013, 9 pages.

Cui, Y., et al. "The Investigation on Electrochemical Reaction Mechanism of CuF2 Thin Film with Lithium", Electrochimica Acta, 2011, vol. 56, pp. 2328-2335.

Doe, R., et al. "First Principles Investigation of Li—Fe—F Phase diagram and Equilibrium and Nonequilibrium Conversion Reactions of Iron Fluorides with Lithium", Chemistry of Materials, 2008, vol. 20, No. 16, pp. 5274-5283.

Doe, R., et al. "First Principles Study of Li—Bi—F Phase Diagram and Bismuth Fluoride Conversion Reactions with Lithium", Electrochemical and Solid State Letters, 2009, vol. 12(7), pp. A125-A128.

Ezema, F. I. and Nnabuchi, M. N. "Optical Properties of Chemical Bath Deposited Bismuth Fluoride (BiF3) Thin Films", Discovery and Innovation vol. 19 (1), 2007, pp. 33-36.

Fu, Z.W., et al. "Electrochemical Reaction of Lithium with Cobalt Fluoride Thin Film Electrode", Journal of the Electrochemical Society, 2005, vol. 152, Issue 2, pp. E50-E55.

Gmitter, A. J., et al. "Electrolyte Development for Improved Cycling Performance of Bismuth Fluoride Nanocomposite Positive Electrodes", Journal of Power Sources vol. 217, 2012, pp. 21-28.

Gmitter, A. J., et al. "Formation, Dynamics, and Implication of Solid Electrolyte Interphase in High Voltage Reversible Conversion Fluoride Nanocomposites", Journal of Materials Chemistry, vol. 20, No. 20, May 28, 2010, p. 3997-4232.

Gocheva, I.D., et al. "Direct Synthesis of Cryolite Type Li3FeF6 and Its Characterization as Positive Electrode in Li Cell", Engineering Sciences Reports, Kyushu University, vol. 31, No. 1, Apr. 2009, pp. 7-11.

Johnson, Z., et al. "Advanced FeF3 Cathode Enabled Lithium-ion Battery", SAE International Journal of Aerospace, Apr. 2009, vol. 1, No. 1, pp. 1018-1023.

Kim, S., et al. "Fabrication of FeF3 Nanoflowers on CNT Branches and Their Application to High Power Lithium Rechargeable Batteries", Advanced Materials, 2010, vol. 22, pp. 5260-5264.

Larcher, D., et al. "Effect of Particle Size on Lithium Intercalation into α-Fe2O3", Journal of the Electrochemical Society, 2003, vol. 150 (1), pp. A133-A139.

Lee, D. H., et al. "Conversion Mechanism of Nickel Fluoride and NiO-Doped Nickel Fluoride in Li Ion Batteries", Electrochimica Acta, 2012, vol. 59, pp. 213-221.

Li, C., et al. "A Mesoporous Iron-Based Fluoride Cathode of Tunnel Structure for Rechargeable Lithium Batteries", Advanced Functional Materials, 2011, vol. 27, pp. 1391-1397.

Li, C., et al. "Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", ACS Nano, 2011, vol. 5, Issue 4, pp. 2930-2938.

Li, C., et al. "Low-Temperature Ionic-Liquid-Based Synthesis of Nanostructured Iron-Based Fluoride Cathodes for Lithium Batteries", Advanced Materials, 2010, vol. 22, pp. 3650-3654.

Li, L., et al. "High-Capacity Lithium-Ion Battery Conversion Cathodes Based on Iron Fluoride Nanowires and Insights into the Conversion Mechanism", Nano Letters, 2012, vol. 12 (11), pp. 6030-6037.

Li, R. F., et al. "Structural and Electronic Properties of Li-Ion Battery Cathode Material FeF3", The Journal of Physical Chemistry C, 2010, vol. 114(39), pp. 16813-16817.

Li, T., et al. "Reversible Three-Electron Redox Behaviros of FeF3 Nanocrystals as High-Capacity Cathode-Active Materials for Li-Ion Batteries", Journal of Physical Chemistry C, Feb. 25, 2010, vol. 114, Issue 7, pp. 3190-3195.

Liao, P., et al. "Combinatorially Prepared [LiF]1-xFex Nanocomposites for Positive Electrode Materials in Li-Ion Batteries", Chemistry of Materials, 2008, vol. 20 (2), pp. 454-461.

Liu, L., et al. "Excellent Cycle Performance of Co-doped FeF3/C Nanocomposite Cathode Material for Lithium-Ion Batteries", Journal of Materials Chemistry, 2012, Issue 22, pp. 17539-17550.

(56) References Cited

OTHER PUBLICATIONS

Liu, P., et al. "Thermodynamics and Kinetics of the Li/FeF3 Reaction by Electrochemical Analysis", The Journal of Physical Chemistry C, 2012, vol. 116(10), pp. 6467-6473.
Ma, Y. and Garofalini, S. H. "Atomistic Insights into the Conversion Reaction in Iron Fluoride: A Dynamically Adaptive Force Field Approach", Journal of the Amerian Chemical Society, 2012, vol. 132, pp. 8205-8211.
Ma, D., et al. "Three-Dimensionally Ordered Macroporous FeF3 and its in situ Homogenous Polymerization Coating for High Energy and Power Density Lithium Ion Batteries", Energy & Environmental Science, 2012, 5, pp. 8538-8542.
Makimura, Y., et al. "Electrochemical behavior of low temperature grown iron fluoride thin films", Electrochemistry Communications, 2006, vol. 8, pp. 1769-1774.
Makimura, Y, et al. "Pulsed Laser Deposited Iron Fluoride Thin Films for Lithium-Ion Batteries", Applied Surface Science 252 (2006), p. 4587-4592.
Mansour, A.N., et al. "In Situ X-ray Absorption Spectroscopic Investigation of the Electrochemical Conversion Reactions of $CuF_2-MoO_3$ Nanocomposite", Journal of Solid State Chemistry, 2010, vol. 183, pp. 3029-3038.
Naghash, A. R. and Lee, J. Y. "Lithium Nickel Oxyfluoride (Li1—zNi1+zFyO2-y) and Lithium Magnesium Nickel Oxide (Li1—z(MgxNi1-x)1+zO2) Cathodes for Lithium Rechargeable Batteries: Part I. Synthesis and Characterization of Bulk Phases", Electrochimica Acta, 2001, vol. 46, pp. 941-951.
Nishijima, M., et al. "Cathode Properties of Metal Trifluorides in Li and Na Secondary Batteries", Journal of Power Sources, 2009, vol. 190, pp. 552-562.
Parkinson, M. F., et al. "Effect of Vertically Structured Porosity on Electrochemical Performance of FeF2 Films for Lithium Batteries", Electrochemica Acta, Apr. 2014, vol. 125, p. 71-82.
Pereira, N., et al. "Iron Oxyfluorides as High Capacity Cathode Materials for Lithium Batteries", Journal of the Electrochemical Society, 2009, vol. 156 (6), pp. A407-A416.
Plitz, I., et al. "Structure and Electrochemistry of Carbon-Metal Fluoride Nanocomposites Fabricated by Solid-State Redox Conversion Reaction", Journal of the Electrochemical Society, 152 (2), 2005, A307-A315.
Polzot, P., et al. "Nano-sized Transition-Metal Oxides as Negative-Electrode Materials for Lithium-Ion Batteries", Letters to Nature, Sep. 28, 2000, vol. 407, pp. 496-499.
Prakash, R., et al. "A Ferrocene-Based Carbon-Iron Lithium Fluoride Nanocomposite as a Stable Electrode Material in Lithium Batteries", Journal of Materials Chemistry, 2010, vol. 20, pp. 1871-1876.
Prakash, R., et al. "Modified Synthesis of [Fe/LiF/C] Nanocomposite, and its Application as Conversion Cathode Material in Lithium Batteries", Journal of Power Sources, 196, 2011, p. 5936-5944.
Rangan, S., et al. "Conversion Reaction of FeF2 Thin Films Upon Exposure to Atomic Lithium", Journal of Physical Chemistry, 2012, vol. 116 (19), pp. 10498-10503.
Rangan, S., et al. "Electronic Structure and Chemical Composition of Candidate Conversion Material Iron Oxifluoride", 220th ECS Meeting, Nov. 3, 2011, Abstract only, 3 pages.
Reddy, M. A. and Fichtner, M. "Batteries Based on Fluoride Shuttle", Journal of Materials Chemistry, 2011, vol. 21, pp. 17059-17062.
Reddy, M. A., et al. "CFx Derived Carbon-FeF2 Nanocomposites for Reversible Lithium Storage", Advanced Energy Materials, vol. 3, Issue 3, Mar. 2013, pp. 308-313.
Sharafat, S., and Ghodiem, N. M. "Chemical Compatibility of Structural Materials with Liquid Li and Sn—Li", APEX Meeting, May 10-12, 2000, Argonne National Laboratory, 31 pages.
Shearer-Turrell, S., et al. "Structural Studies of Iron Hexafluorides: Infrared Spectra of M3FeF6 (M=Li, Na, K, Rb, Cs, Ag, Ti)", Journal of Molecular Structure, 1971, vol. 7, pp. 289-300.
Tressaud, et al. "Les Hesxafluoferrites M3FeF6 (M=Li, Na, K, Rb, Cs, Ag, Ti, NH4): Etude Radiocristallo-graphique, Spectroscopique et Magnetique", Journal of Inorganic and Nuclear Chemistry, 1970, vol. 32, pp. 2179-2186.
Wang, F., et al. "Conversion Reaction Mechanisms in Lithium Ion Batteries: Study of the Binary Metal Fluoride Electrodes", Journal of the American Chemical Society, 2011, vol. 133 (46), pp. 18828-18836.
Wang, F., et al. "Ionic and Electronic Transport in Metal Fluoride Conversion Electrodes", Northeastern Center for Chemical Energy Storage, PRiME 2012, 222nd Meeting Electrochemical Society, Oct. 9, 2012, 23 pages.
Wang, F., et al. "Tracking Lithium Transport and Electrochemical Reactions in Nanoparticles", Nature Communications, vol. 3, Nov. 13, 2012, 8 pages.
Wiaderek, K. M., et al. "Comprehensive Insights into the Structural and Chemical Changes in Mixed-Anion FeOF Electrodes by Using Operando PDF and NMR Spectroscopy", Journal of the American Chemical Society, Jan. 8, 2013, 9 pages.
Yamakawa, N., et al. "Identifying the Local Structures Formed During Lithiation of the Conversion Material, Iron Fluoride, in a Li Ion Battery: A Solid-State NMR, X-ray Diffraction, and Pair Distribution Function Analysis Study", Journal of American Chemical Society, 131, 2009, p. 10525-10536.
Yamakawa, N., et al. "Investigation of the Conversion Reaction Mechanisms for Binary Copper (II) Compounds by Solid-State NMR Spectroscopy and X-ray Diffraction", Chemistry of Materials, 2009, vol. 21, pp. 3162-3176.
Cui, Yan-Hua, et al. "Electrochemical Properties of MnF2 Films Fabricated by Pulsed Laser Deposition", Journal of Inorganic Material, vol. 25, No. 2, Feb. 2010, 6 pages.
Yang, Z., et al. "First Principles Study on the Structural, Magnetic and Electronic Properties of Co-doped FeF3", Computational and Theoretical Chemistry, 2012, vol. 980, pp. 44-48.
Yao, W., et al. "Multilayered Cobalt Oxide Platelets for Negative Electrode Material of a Lithium-Ion Battery", Journal of the Electrochemical Society, 2008, vol. 155, Issue 12, pp. A903-A908.
Zhang, H., et al. "Nanostructured Nickel Fluoride Thin Film as a New Li Storage Material", Solid State Sciences, 2008, vol. 10, pp. 1166-1172.
Zhang, W., et al. "Synthesis and Characterization of in Situ Fe2O3-Coated FeF3 Cathode Materials for Rechargeable Lithium Batteries", Journal of Materials Chemistry, 2012, vol. 22, pp. 24769-24775.
Zhou, M., et al. "Thermal Stability of FeF3 Cathode for Li-ion batteries", Journal of Power Sources, 195, 2010, p. 4952-4956.
Zhou, Y., et al. "LiF/Co Nanocomposite as a New Li Storage Material", Electrochemical and Solid-State Letters, vol. 9, No. 3, 2006, p. A147-A150.
Zu, C. and Li, H. "Thermodynamic Analysis on Energy Densities of Batteries", Energy & Environmental Science, 2011, vol. 4, pp. 2614-2624.
Extended European Search Report mailed Apr. 14, 2015 in EP 14169514.8, 6 pages.

METHOD AND SYSTEM FOR PROCESSING LITHIATED ELECTRODE MATERIAL

CROSS-REFERENCE TO RELATED APPLICATIONS

This application claims priority from U.S. Provisional Patent Application No. 61/858,602, filed Jul. 25, 2013, entitled "METHOD AND SYSTEM FOR PROCESSING LITHIATED ELECTRODE MATERIAL", which is incorporated by reference herein for all purposes.

BACKGROUND OF THE INVENTION

The present invention is directed to energy storage devices and methods thereof.

It is to be appreciated that the use of cathode conversion material has been described in the U.S. patent application Ser. No. 13/922,214, entitled "NANOSTRUCTURED MATERIALS FOR ELECTROCHEMICAL CONVERSION REACTIONS" filed 19 Jun. 2013, which is incorporated by reference herein. The method of manufacturing cathode conversion material is described in the U.S. Provisional Patent Application No. 61/803,802, entitled "METHOD FOR FORMING IRON FLUORIDE MATERIAL", filed 21 Mar. 2013, which is incorporated by reference herein.

In various applications, it is desirable to provide lithiated conversion material, which is described below.

DETAILED DESCRIPTION OF THE INVENTION

The present invention is directed to energy storage devices and methods thereof. More specifically, embodiments of the present invention provide techniques for forming lithiated electrode material. In various embodiments, a conversion material is processed using n-BuLi solution to form iron nanoparticles and lithiated fluoride and/or oxide material. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

For lithium-based secondary batteries, the use of conversion materials (typically at the cathode portion of the battery) can provide many benefits and advantages, such as high energy density and low hysteresis. As a part of manufacturing conversion material based secondary batteries, it is desirable to have lithiated conversion materials. More specifically, lithiated fluoride and/or oxide material used in conjunction with iron nanoparticles, as described below, is very useful. In various embodiments, lithiation of conversion materials can be performed using solid state synthesis and solution process. For example, the lithiation targets cover from $FeF_3$, $FeOF$, and $FeF_2$ to other metal fluorides (e.g., $CoF_2$, $CuF_2$, $NiF_2$, and others) in charged state, and the lithiation process produces products containing composite nanostructures. For example, nanostructures include $Fe^0$ nanoparticles (and/or other metal nanoparticles) mixed with LiF nanoparticles forming regular nanodomains. It is to be appreciated the lithiated material produced in lithiation process can be used for making positive electrodes in conversion batteries without the need to fabricate Li metal as the anode. In certain implementations involving lithiation in solid state synthesis, lithiation chemicals such as $Li_3N$, and/or LiH can be used; in solution based processes, lithiation chemicals can be n-BuLi, n-hexyl lithium and/or $LiBH_4$. It is to be appreciated that other materials are possible as well. During manufacturing processes, the growth rate and the synthesis speed is control to obtain desirable nanoparticle size and distribution, as described below.

According to various embodiments, the lithiation process can produce nanodomains containing metal and LiF nanoparticles, which can be cycled between 1.5-4.0 V (also potentially in larger voltage window). It is to be appreciated that a capacity of 200 mAh/g or higher can be reached for fully lithiated particles.

In comparison, convention techniques of chemical lithiation of $FeF_3$, $FeF_2$, and other types of fluoride material, use Li metal and $Li_xN$ material and a one-step process, which cannot be modified to control reaction process and iron nanoparticle sizes and distribution. Unfortunately, lithiation of material by conventional techniques typically yield poor energy density and/or cycle life.

Figure 1:
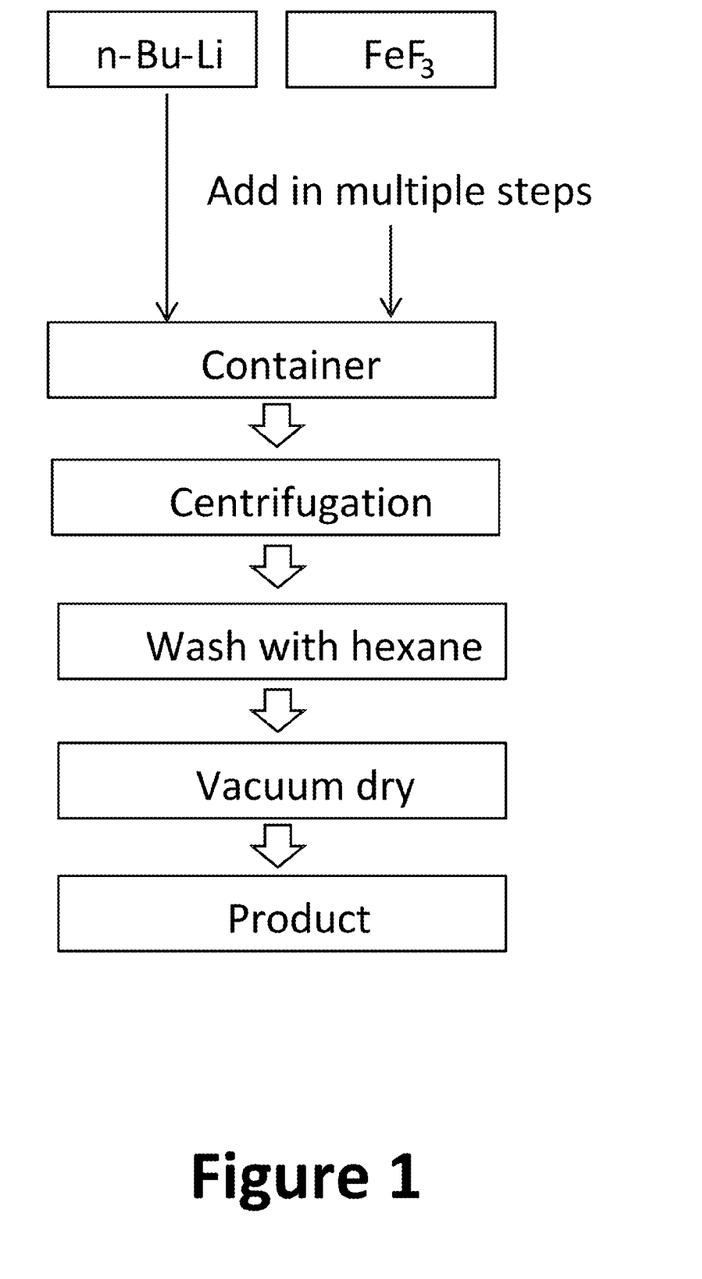
FIG. 1 is a simplified flow diagram illustrating a process for processing lithiated conversion material according to embodiments of the present invention.

FIG. 1 is a simplified flow diagram illustrating a process for processing lithiated conversion material according to embodiments of the present invention. This diagram is merely an example, which should not unduly limit the scope of the claims. One of ordinary skill in the art would recognize many variations, alternatives, and modifications. For example, various steps can be added, removed, repeated, overlapped, replaced, modified, and/or overlapped. As shown in FIG. 1, n-BuLi material and iron fluoride material ($FeF_3$) material are mixed together. More specifically, the iron fluoride material is in a powder form, and the n-BuLi material is a solution. As an example, n-BuLi is an abbreviation referring to n-Butyllithium material with a molecular formula of $C_4H_9Li$, which is an organolithium reagent. Depending on the application, the n-BuLi solution is characterized by a concentration of about 2M. It is to be appreciated that other concentration levels are possible as well, such as 0.5M, 1M, 10M, etc. In an implementation, the cathode conversion material is provided as a layer of thin-film, and the layer is characterized by a thickness of less than 100 um. For example, the cathode conversion material comprises $FeF_2$ and/or $FeF_3$ material. Depending on the application, the cathode conversion material may additionally include metal oxide material.

The n-BuLi material is a solution and it is added to a container. The conversion material (i.e., iron fluoride) is added to the container to react with the n-BuLi solution. The conversion material is gradually (or performed in multiple steps) added to the n-BuLi so the two materials can be efficiently mixed. Depending on the application, the temperature for the reaction is controlled. For example, the n-BuLi temperature is predetermined to compensate for the heat generated by the reaction between the n-BuLi and the conversion material. For example, the cathode conversion powder material is immersed within the n-BuLi solution for about 24 hours or even longer. As a result of prolonged mixing, a solid layer of a lithiated fluoride and/or oxide material and iron ($Fe^0$) nanoparticles and an organic byproduct material are formed over the surfaces of the cathode conversion material. In certain embodiments, centrifugation is performed to facilitate the reaction. For example, the reaction mechanism between $FeF_3$ material and n-BuLi material can be attributed to alkyl group coupling and/or through β-hydride elimination.

The mechanism for alkyl group coupling can be described by:

$2FeF_3+6"BuLi→2Fe—(LiF)_3+3"C_8H_{18}("Octane)$

The mechanism for β-hydride elimination can be described by:

$2FeF_3+6"BuLi→2Fe—(LiF)_3+3"C_4H_{10}("butane)+3^1-C_4H_8(^1-butene)$

The lithiated fluoride and/or oxide material is characterized by a primary size of about 10-300 nm containing a nanodomain of 1 to 5 nm homogeneously distributed $Fe^o$ and LiF nanoparticles, and a secondary size of about 200 nm up to microsize. It is to be appreciated that these particle sizes are suitable for manufacturing highly efficient secondary batteries, as explained below. The lithiated fluoride and/or oxide, and the iron nanoparticle can be readily used in the manufacturing of conversion batteries. For example, the The mechanism for reaction between $Li_3N$ with $FeF_3$ can be described by:

$Li_3N+FeF_3→Fe^0+3LiF+½N_2$

The mechanism for reaction between $Li_3N$ with FeOF can be described by:

$Li_3N+FeOF→Fe^0+LiFeO+2LiF+½N_2$

The organic byproduct (e.g., octane, butane, and/or butene) are to be removed. In a specific embodiment, the organic byproduct is removed using a substantially non-polar solvent, such as hexane. It is to be appreciated that other types of solvents can be used as well.

The layer of the lithiated fluoride and/or oxide material and the iron nanoparticles is then dried in a substantially vacuum environment at a temperature of between about 10 to 100 degrees Celsius to form a layer of lithiated cathode conversion material. In a specific embodiment, the drying temperature is about 80 degrees Celsius. The layer of lithiated cathode conversion material can be further processed. For example, carbon (C-65) additive and/or polymer binder (e.g., PVDF-HFP) can be added to the layer of lithiated cathode conversion material. In a certain embodiments, the lithiated cathode conversion material is deposited on a cathode current collector, which can be aluminum, stainless steel, nickel, and/or other types of material.

Figure 2:
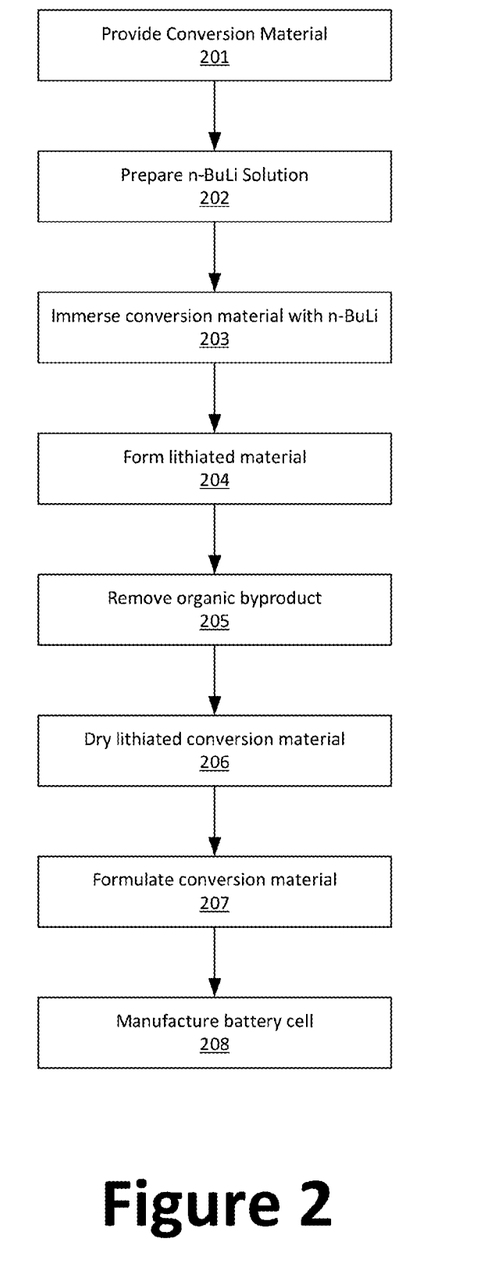
FIG. 2 is a simplified flow diagram illustrating a process of lithiating conversion material deposited on a current collector according to embodiments of the present invention.

FIG. 2 is a simplified flow diagram illustrating a process of lithiating conversion material deposited on a current collector according to embodiments of the present invention. This diagram is merely an example, which should not unduly limit the scope of the claims. One of ordinary skill in the art would recognize many variations, alternatives, and modifications. For example, various steps can be added, removed, repeated, overlapped, replaced, modified, and/or overlapped.

The process of lithiating conversion material is performed on the cathode conversion material, which is provided in step 201, that is deposited on a current collector. For example, the current collector can be made of aluminum, stainless steel, nickel, and/or other materials. The cathode conversion material is in a thin-film layer form and characterized by the thickness of less than 100 um. In a specific embodiment, the thickness is about 20 to 70 um. The conversion material comprises iron and fluoride and/or oxide material.

An n-BuLi solution is needed to react with the cathode conversion material. At step 202, an n-BuLi solution is provided and characterized by a concentration of about 2M. In a specific embodiment, the reaction concentration is about 0.5M to 1M. It is to be appreciated that the n-BuLi solution is substantially non-reactive with the current collector material.

At step 203, the surfaces of the cathode conversion material is immersed in the n-BuLi solution for at least 24 hours. For example, the long immersion time is required to account for the slow reaction that takes time. Other durations may be possible as well, depending on the bathing condition of n-BuLi solution within the conversion material. For example, depending on the n-BuLi concentration and/or other reaction conditions, the reaction time can be 1 hour, 2 hours and up to over 24 hours. In certain embodiments, the n-BuLi solution is stirred. It is to be appreciated that depending on the specific application, the immersion reaction is substantially exothermic and release heat, which is to be removed. For example, the reaction takes place in a container or reaction vessel that is surrounding by cooling fluid, and the amount of cooling is controlled by a cooling apparatus, such as cooling bath. In certain embodiments, mixed chemicals, such as acetone and/or dry ice, are used to lowered the temperature of the reactants.

At step 204, a substantially solid layer of a lithiated fluoride and/or oxide material and iron nanoparticles and an organic byproduct material are formed over the surfaces of the cathode conversion material. The lithiated fluoride and/or oxide material is characterized by a primary size of about 10-300 nm containing a nanodomain of 1 to 5 nm homogeneously distributed $Fe^o$ and LiF nanoparticles, and a secondary size of about 200 nm up to microsize.

It is to be appreciated that the organic byproduct is resulted from the reaction between the conversion material and the n-BuLi solution, where the n-BuLi solution contributes carbon material. The organic byproduct material is removed at step 205 using a substantially non-polar solvent. For example, the solvent can be a hexane solution. The non-polar solvent is substantially non-reactive with the lithiated conversion material to prevent undesirable removal of conversion material.

At step 206, the surface of the layer of the lithiated fluoride and/or oxide material and the iron nanoparticles is dried at temperature of between about 10 to 100 degrees Celsius to form a layer of lithiated cathode conversion material. For example, the drying is performed in a substantially vacuum environment. In a specific embodiment, the drying temperature is about 80 degrees Celsius. For example, the iron nanoparticles are characterized by a valence state of $Fe^o$.

Additional steps may be performed to process the lithiated conversion material for utilization thereof in battery cells. At step 207, the lithiated conversion material is further formulated. For example, the layer of lithiated cathode conversion material is in a substantially formulated form with carbon additive and/or polymer binder by adding these materials. For example, the carbon material can be carbon-65, Ketjen Black EC600JD (KJ600), and/or carbon material characterized by a high-surface-to-volume ratios The lithiated conversion material is used in the manufacturing of battery cell(s), at step 208. For example, electrolyte is deposited on the lithiated conversion material as the next step of processing. Other steps are to be performed as well, such as forming anode and anode current collector, etc.

Figure 3:
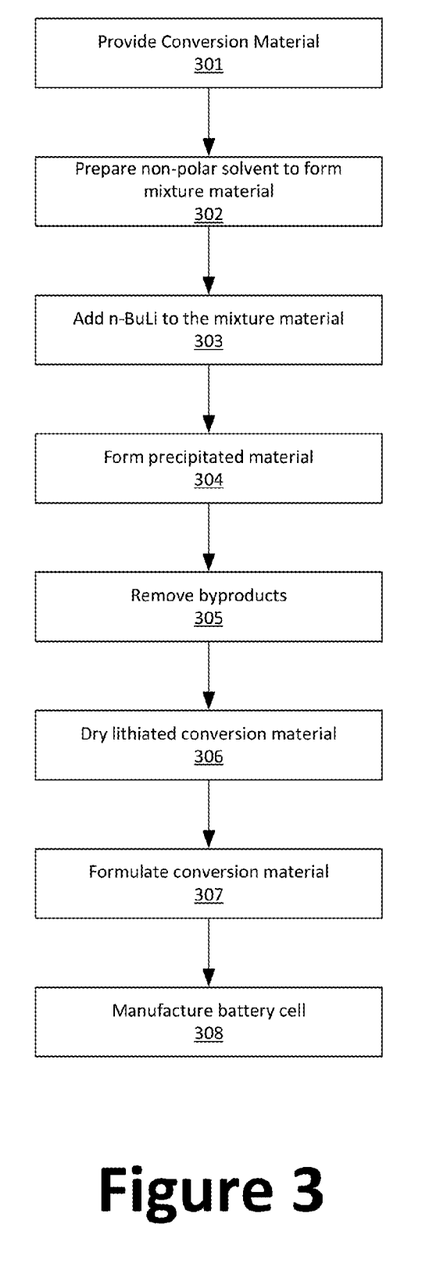
FIG. 3 is a simplified flow diagram illustrating a process of lithiating conversion material in powder form according to embodiments of the present invention.

FIG. 3 is a simplified flow diagram illustrating a process of lithiating conversion material in powder form according to embodiments of the present invention. This diagram is merely an example, which should not unduly limit the scope of the claims. One of ordinary skill in the art would recognize many variations, alternatives, and modifications. For example, various steps can be added, removed, repeated, overlapped, replaced, modified, and/or overlapped.

At step 301, a powder material comprising iron material and fluoride material is provided. The powder material may additionally include oxide material. The powder material is characterized by particle size of about 10 nm to 500 nm. Depending on the implementation, the powder material can have a size of about 50 nm to 70 nm. In an embodiment, the powder material can have a size of about 200 nm to 300 nm.

At step 302, a substantially non-polar solvent is prepared, and the powder material is immersed into the non-polar solvent to form a mixture material. Among other things, the non-polar solvent facilitates reaction between the n-BuLi material and the conversion material. For example, the non-polar solvent is characterized by a first molar quantity.

At step 303, n-BuLi solution is added to the mixture material. The n-BuLi solution is characterized by a second molar quantity. The ratio between the first quantity and the second quantity is at least about 1:3. Depending on the application, the ratio can be 1:3.1 to 1:3.5. The n-BuLi solution, in an implementation, is added to the mixture material drop-wise, and if needed, while stirring the mixture material. For example, the mixture material is stirred by an automatic stir, while the n-BuLi is added to the mixture.

A precipitated material is formed within the BuLi solution, at step 304. The precipitated material comprises lithiated fluoride material, iron nanoparticles, and an organic byproduct. The lithiated fluoride and/or oxide material is characterized by a primary size of about 10-300 nm containing a nanodomain of 1 to 5 nm homogeneously distributed $Fe^o$ and LiF nanoparticles, and a secondary size of about 200 nm up to microsize. As explained above, the organic byproduct is formed due to the organic material from the n-BuLi solution.

At step 305, the organic byproduct and excess n-BuLi material are removed from the precipitated material to obtain a lithiated conversion material. For example, a non-polar solvent, such as hexane, is used.

At step 306, the lithiated conversion is dried at temperature of between about 10 to 100 degrees Celsius. For example, the drying is performed in a substantially vacuum environment. In a specific embodiment, the drying temperature is about 80 degrees Celsius. For example, the iron nanoparticles are characterized by a valence state of $Fe^o$.

Additional steps may be performed to process the lithiated conversion material for utilization thereof in battery cells. At step 307, the lithiated conversion material is further formulated. For example, the layer of lithiated cathode conversion material is in a substantially formulated form with carbon additive and/or polymer binder by adding these materials. In addition, the lithiated conversion material can be deposited on a current collector, which can be made of aluminum, stainless steel, nickel, and/or other types of materials.

The lithiated conversion material is used in the manufacturing of battery cell(s), at step 308. For example, electrolyte is deposited on the lithiated conversion material as the next step of processing. Other steps are to be performed as well, such as forming anode and anode current collector, etc.

According to various embodiments, electrochemical devices (or secondary batteries) utilize the lithiated conversion material at its cathode component. In a specific embodiment, an electrochemical device includes an anode current collector, a cathode current collector, and a layer of solid material positioned between the anode current collector and the cathode current collector, the solid material comprising iron nanoparticles and lithiated fluoride material characterized by a primary size of about 10-300 nm containing a nanodomain of 1 to 5 nm homogeneously distributed $Fe^o$ and LiF nanoparticles, and a secondary size of about 200 nm up to microsize. For example, the solid material comprises substantially lithiated conversion material manufactured according to the processes described above. The layer of solid material may further include carbon material and/or polymer binder material. It is to be appreciated that the lithiated conversion material can provide a capacity of at least 200 mAh/g. There are other benefits as well.

Figure 4:
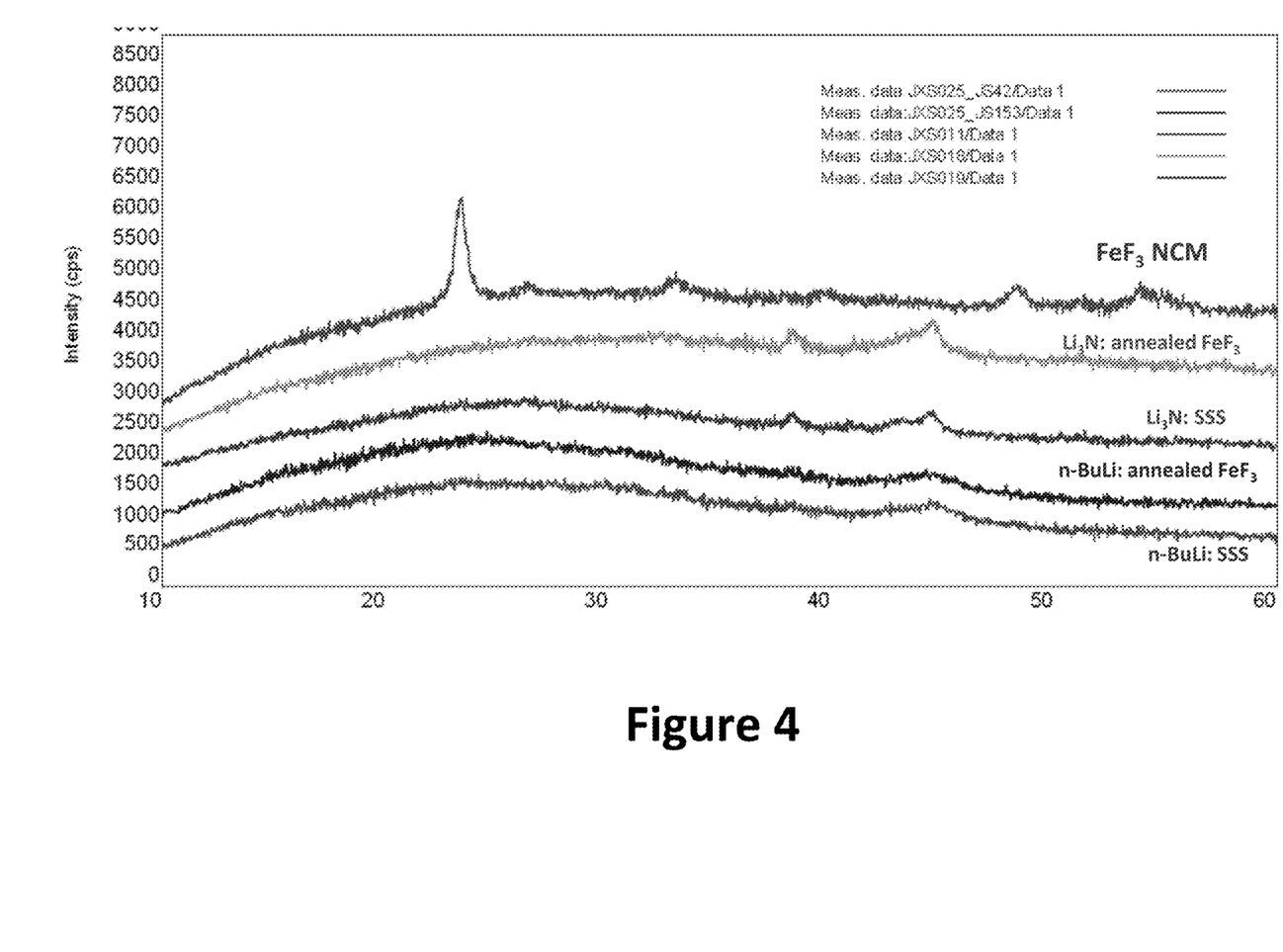
FIG. 4 is an XRD graph illustrating uniformity of conversion material manufactured using n-BuLi material according to an embodiment of the present invention.

It is to be appreciated that the lithiated conversion material can provide numerous benefits. FIG. 4 is an XRD graph illustrating uniformity of conversion material manufactured using n-BuLi material according to an embodiment of the present invention. As shown in FIG. 4, lithiated $FeF_3$ materials (both annealed $FeF_3$ and solid state conversion material) produced using n-BuLi solution exhibit a high degree of uniformity and evenness, as demonstrated by lack of any spikes. In contrast, conversion material manufactured by other means exhibit much more non-uniformity demonstrated by the spikes in the XRD graph. For cathode conversion material, uniformity is associated high performance and efficiency, and thus highly desirable.

Figure 5A:
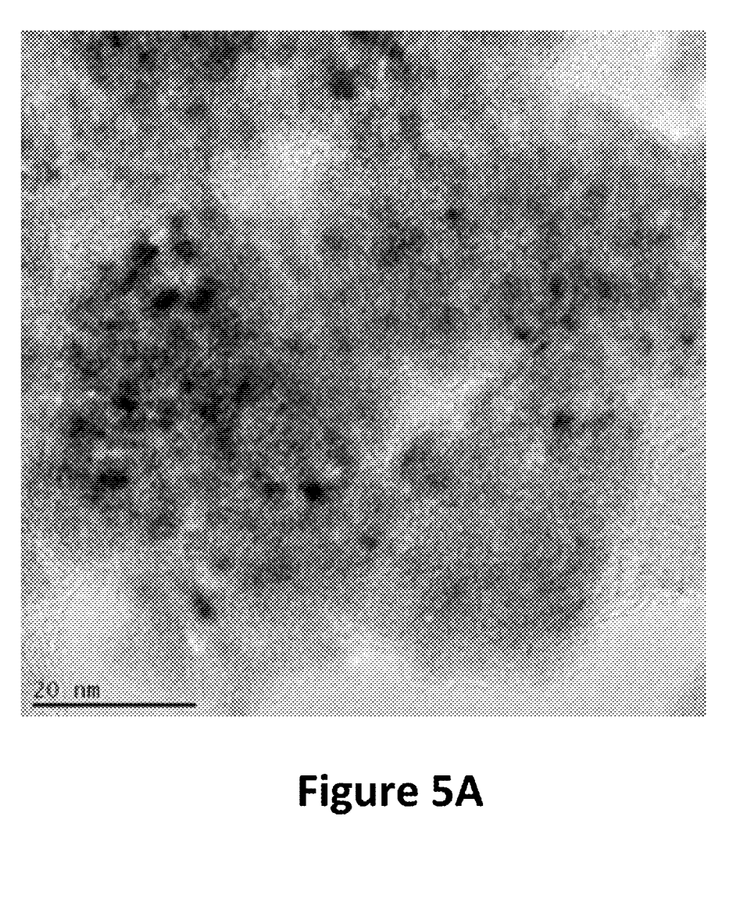
FIGS. 5A and 5B are photos of lithiated conversion material deposited as thin film material processed according to embodiments of the present invention.
Figure 5B:
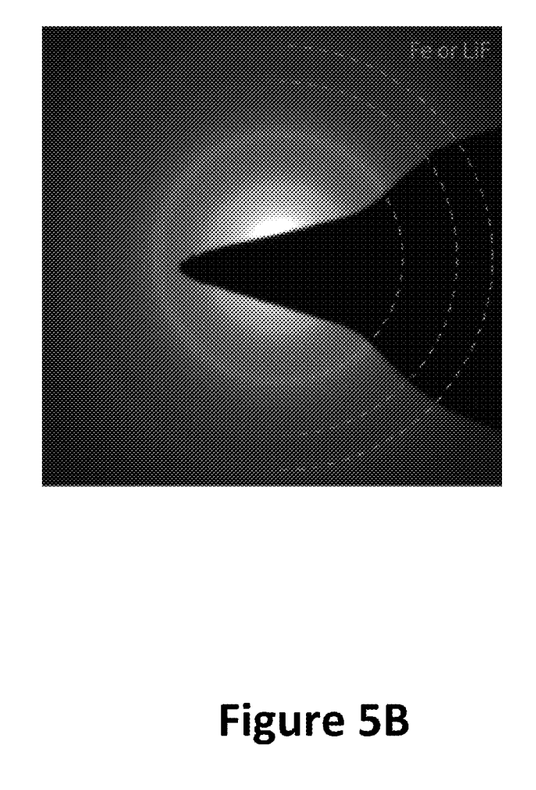

FIGS. 5A and 5B are photos of lithiated conversion material deposited as thin film material processed according to embodiments of the present invention. FIG. 5A shows a layer of lithiated conversion material on a 20 nm scale. As FIG. 5A shows, the particle sizes, which include both lithiated fluoride and iron nanoparticles, are substantially uniform. More specifically, the dark particles in FIG. 5A are iron nanoparticles. FIG. 5B shows the diffraction pattern of the lithiated conversion material. The concentric rings indicate that the material is substantially a crystalline structure with a high level of uniformity.

Figure 6A:
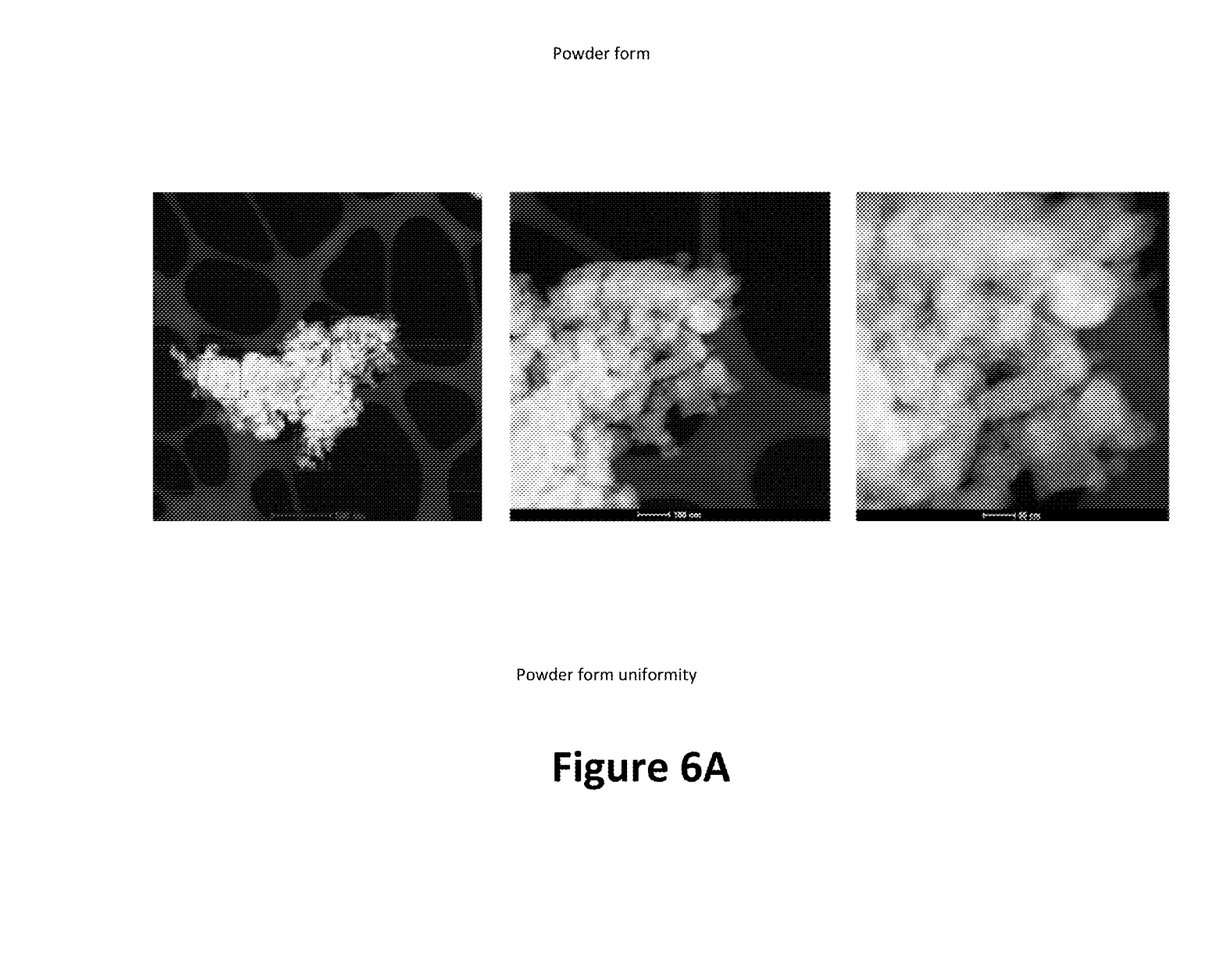
FIGS. 6A and 6B are photos of lithiated conversion material in powder form processed according to embodiments of the present invention.
Figure 6B:
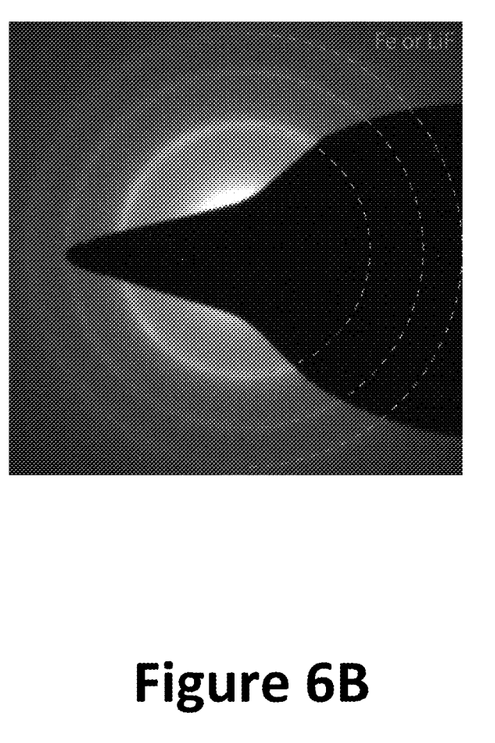

FIGS. 6A and 6B are photos of lithiated conversion material in powder form processed according to embodiments of the present invention. As shown in FIG. 6A, the particle sizes for the lithiated conversion material is uniform, at 500 nm, 100 nm, and 50 nm scales. FIG. 6B shows the diffraction pattern of the lithiated conversion material in powder form. Similar to FIG. 5B, the concentric rings in FIG. 6 indicate that the material is substantially a crystalline structure with a high level of uniformity.

Figure 7:
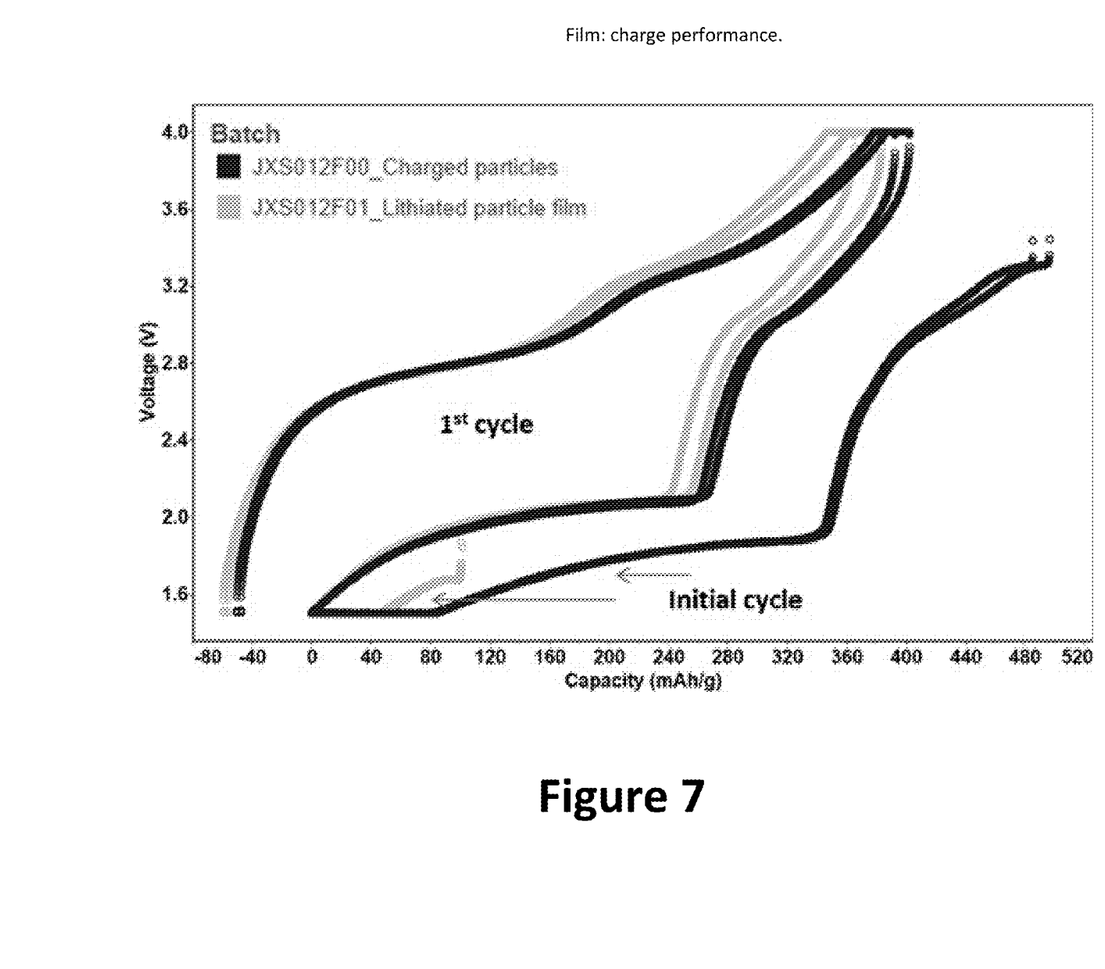
FIG. 7 is a voltage versus capacity graph comparing the charged electrode film and lithiated electrode film processed according to embodiments of the present invention.

FIG. 7 is a voltage versus capacity graph comparing the charged electrode film and lithiated electrode film processed according to embodiments of the present invention. As shown in FIG. 7, the lithiated electrode film has close capacity and hysteresis performance to its charged counterparts, demonstrating the validity of chemical solution lithiation process, which can produce nanodomain (e.g., 1-5 nm) Fe and LiF nanoparticles well mixed together and exhibit excellent electrochemical performance.

Figure 8A:
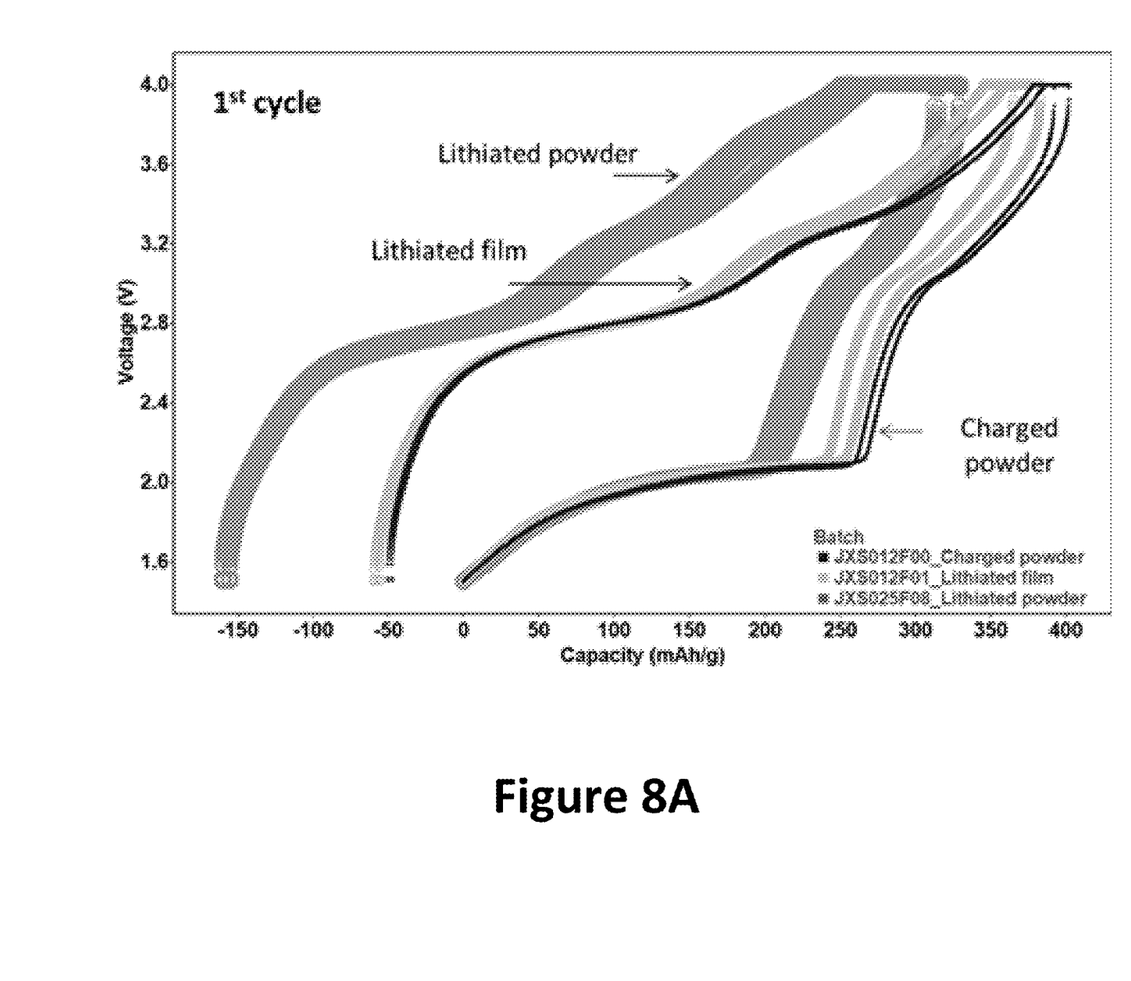
FIGS. 8A and 8B are voltage versus capacity graphs comparing electrochemical performances of lithiated powders against conventional.
Figure 8B:
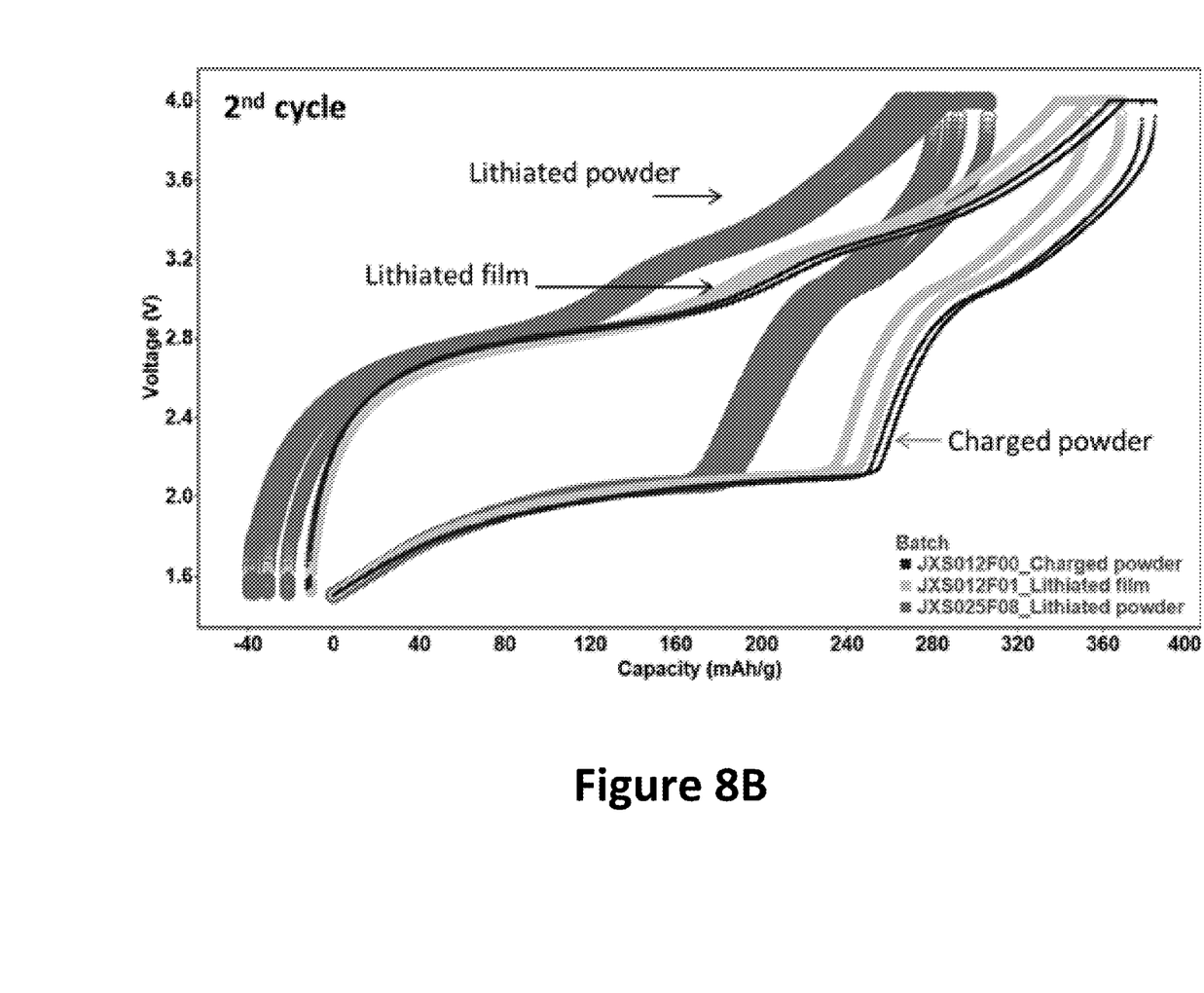

FIGS. 8A and 8B are voltage versus capacity graphs comparing electrochemical performances of lithiated powders against conventional. FIG. 8A shows the first cycling data in which the lithiated powder has a higher hysteresis in charging. FIG. 8B shows that from the second cycling and on, the high hysteresis of the lithiated powder is reduced, indicating the lithiated powders have also reached a high electrochemical performance.

It is to be appreciated that techniques for making lithiated conversion material according to embodiments of the present invention provide many benefits. As explained above, the lithiated material made according to embodiments of the present invention exhibit a high degree of uniformity at the nanometer scale, and thus afford a high level of performance and efficiency. The use of n-BuLi solution is compatible with existing techniques and available materials, and therefore can be used in large scale manufacturing process of electrochemical devices.

More specifically, processes according to the present invention provide better reaction control both, kinetically and hydrodynamically, in comparison to existing processes. The better reaction control affords better controlling of particle size and nanodomains for conversion batteries.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for processing a cathode material, the method comprising:
  providing a cathode conversion material, the cathode conversion material being in a thin-film layer form and characterized by the thickness of less than 100 um, the conversion material comprising iron and fluoride material;
  preparing a n-BuLi solution characterized by a concentration;
  immersing surfaces of the cathode conversion material in the n-BuLi for a duration to reach substantially full lithiation;
  forming a substantially solid layer of a lithiated fluoride and/or oxide material and iron nanoparticles and an organic byproduct material over the surfaces of the cathode conversion material, the lithiated fluoride and/or oxide material being characterized by a primary particle of 10-300 nm containing a nanodomain of 1 to 5 nm homogeneously distributed $Fe^{\circ}$ and LiF nanoparticles, and a secondary size of about 200 nm up to microsize;
  removing the organic byproduct material using a substantially non-polar solvent; and
  drying the surfaces of the layer of the lithiated fluoride and/or oxide material and the iron nanoparticles at a drying temperature of between about 10 to 100 degrees Celsius to form a layer of lithiated cathode conversion material.

2. The method of claim 1 wherein the concentration is less than 2M.

3. The method of claim 1 wherein the duration is at least 24 hours.

4. The method of claim 1 wherein the duration is determined based on n-BuLi concentration.

5. The method of claim 1 wherein the cathode conversion material comprises $FeF_2$ and/or $FeF_3$ material.

6. The method of claim 1 wherein the layer of lithiated cathode conversion material is in a substantially formulated form with carbon additive and/or polymer binder.

7. The method of claim 1 further comprising depositing the layer of lithiated cathode conversion material onto a current collector.

8. The method of claim 1 wherein the drying temperature is about 80 degrees Celsius.

9. The method of claim 1 wherein the drying is performed in a substantially vacuum environment.

10. The method of claim 1 wherein the iron nanoparticles are substantially in a $Fe^0$ valence state.

11. The method of claim 1 further comprising removing excess n-BuLi material from the surfaces of the cathode conversion material.

12. The method of claim 1 wherein the n-BuLi solution is characterized by a concentration of about 0.5M to 10M.

13. The method of claim 1 wherein the thin film layer is characterized by a thickness of about 20 to 70 um.

14. The method of claim 1 wherein the cathode conversion material is deposited on a current collector, the current collector being substantially non-reactive with the n-BuLi solution.

15. The method of claim 1 further comprising controlling the temperature of the surface of the cathode conversion material, the temperature being between about −78 degrees C. and 30 degrees C.

* * * * *